(12) United States Patent
Matityahu et al.

(10) Patent No.: US 8,369,218 B2
(45) Date of Patent: Feb. 5, 2013

(54) ZERO-INTERRUPT NETWORK TAP

(75) Inventors: Eldad Matityahu, Palo Alto, CA (US); Kai Liu, Fremont, CA (US); Stephen Strong, Fremont, CA (US)

(73) Assignee: Net Optics, Inc., Santa Clara, CA (US)

( * ) Notice: Subject to any disclaimer, the term of this patent is extended or adjusted under 35 U.S.C. 154(b) by 1535 days.

(21) Appl. No.: 10/834,448

(22) Filed: Apr. 28, 2004

(65) Prior Publication Data

US 2005/0257262 A1    Nov. 17, 2005

(51) Int. Cl.
H04L 12/26    (2006.01)

(52) U.S. Cl. .................................................. 370/235

(58) Field of Classification Search .................. None
See application file for complete search history.

(56) References Cited

U.S. PATENT DOCUMENTS

| | | | | |
|---|---|---|---|---|
| 5,539,727 A * | 7/1996 | Kramarczyk et al. | ........ | 370/222 |
| 5,781,318 A | 7/1998 | Tremblay | | |
| 6,041,037 A | 3/2000 | Nishio et al. | | |
| 6,167,025 A | 12/2000 | Hsing et al. | | |
| 6,424,627 B1 | 7/2002 | Sorhaug et al. | | |
| 6,449,247 B1 | 9/2002 | Manzardo et al. | | |
| 6,898,630 B2 | 5/2005 | Ueno et al. | | |
| 6,925,052 B1 * | 8/2005 | Reynolds et al. | ............. | 370/217 |
| 6,944,437 B2 * | 9/2005 | Yang et al. | ..................... | 455/323 |
| 6,975,209 B2 * | 12/2005 | Gromov | ........................ | 375/258 |
| 7,277,957 B2 | 10/2007 | Rowley et al. | | |
| 7,486,625 B2 | 2/2009 | Matityahu et al. | | |
| 7,627,029 B2 * | 12/2009 | Ho et al. | ...................... | 375/229 |
| 2001/0040870 A1 | 11/2001 | Ohmori et al. | | |
| 2002/0176355 A1 | 11/2002 | Mimms et al. | | |
| 2003/0112760 A1 | 6/2003 | Puppa et al. | | |
| 2003/0184386 A1 * | 10/2003 | Varner et al. | ................... | 330/288 |
| 2004/0120259 A1 * | 6/2004 | Jones et al. | .................... | 370/250 |
| 2004/0190547 A1 * | 9/2004 | Gordy et al. | .................. | 370/463 |
| 2005/0005031 A1 * | 1/2005 | Gordy et al. | .................. | 709/250 |
| 2005/0071711 A1 * | 3/2005 | Shaw | ............................... | 714/27 |
| 2005/0129033 A1 | 6/2005 | Gordy et al. | | |
| 2005/0231367 A1 * | 10/2005 | Bellantoni | ................. | 340/572.1 |
| 2005/0257262 A1 | 11/2005 | Matityahu et al. | | |
| 2006/0083511 A1 | 4/2006 | Edmunds et al. | | |
| 2007/0002754 A1 | 1/2007 | Matityahu et al. | | |
| 2008/0014879 A1 * | 1/2008 | Light et al. | .................... | 455/130 |

OTHER PUBLICATIONS

"Fast Ethernet Fiber-to-Fiber Converters", Canary Communications: Inc. 7 pages total, 2004.
"Sequence Reducer/ Sequence Mirror Operator's Guide", Peribit Networks, Inc. 13 pages total, 2001-2005.
"PeriSoope Central Management System (CMS) 5.0 Administrators Guide", Peribit Networks, Inc. 13 pages total. 2003-2004.
"VSS Coppertap Literature": VSS Monitoring Inc. 2 pages. 2003-2004.

(Continued)

*Primary Examiner* — Nittaya Juntima
*Assistant Examiner* — Rhonda Murphy
(74) *Attorney, Agent, or Firm* — IPSG, P.C. Intellectual Property Law

(57) ABSTRACT

A network tap monitors network information flow over a particular connection. By duplicating the signal and diverting a copy, the information flow can be analyzed, both in real time and without interference through the monitoring process. When the power to the tap is either turned on or off, however, the change in impedance in the tap's circuit can create an interference spike in the connection that interrupts the information flow. By reducing or eliminating the impedance change in the tap circuitry, such disruptive interruptions can be eliminated.

14 Claims, 4 Drawing Sheets

OTHER PUBLICATIONS

"VSS Easy Install Guide", VSS Monitoring Inc. 8 pages total. 2003-2005.
"VSS Linksafe", VSS Monitoring Inc., 1 page. 2003-2005.
"Non Final Office Action", U.S. Appl. No. 11/174,032, Mailing Date: Apr. 23, 2008.
Belkin International, Inc., "Belkin Quick installation Guide", N1 Vision Wireless Router, Belkin International, Inc., Compton, CA, Feb. 11, 2009, 3 pages total.
Belkin International, Inc., "Network Status Display", Belkin International, Inc., Compton, CA, 2007, 1 page total.
Anonymous, "100Base-TX/100BBase-FX Media Converters E-100BTX-FX-04 User's Guide", Transitions Networks, Minneapolis, MN, Copyright 1998-2000, 4 pages.
"Replacement Statement and Explanation under 37CFR 1.915 In Support of Request for Inter Partes Reexamination of US Patent 7,486,625", Sonnenschein Nath & Rosenthal LLP, Jan. 22, 2010, 251 pages.
"Request for Inter Partes Reexamination of US Patent 7,486,625", Sonnenschein Nath & Rosenthal LLP, Dec. 18, 2009, 69 pages.

* cited by examiner

ZERO-INTERRUPT NETWORK TAP

BACKGROUND OF THE INVENTION

1.A. Field of the Invention

The explosive growth of intercommunication between computers over the Internet has created a consequential need for means to monitor networks while they are working, in order to assure that the communication flows stay within acceptable limits of both speed and quality. To assure and measure a network's connections, the communications flowing through them must be monitored and the communication flow subjected to analysis.

Monitoring and analyzing the communication flows requires both physical and logical assessment. Physical assessment must test each of the several criteria (e.g. voltage drop, baud, clarity) that define a particular connection's physical constraints; while logical assessment must similarly test each of the several criteria (e.g. routing, authorization, timing) that define a particular communication's logical constraints. Recently it has become a normal procedure to tap into the signal flow over a connection being analyzed.

One problem that had to be solved, for both electrical/copper and optical/fiber connections, was how to tap into the communication flow without interfering with the traffic that was passing through the connection being tapped. Physically, any tap potentially creates interference (either from a drop in potential or timing delay); logically, a tap could become an unsought and unwanted network termination. In perhaps no other field is the Heisenberg principle (that the act of observation changes the behavior of whatever is being observed) more keenly felt. As the signal speed and sensitivity of communications and especially computer networks increased, the interference potential from any tap also went up, in linear, locked progression.

Generally, network taps need only be consulted a small portion of the time. The problem was that every time a tap's power was turned on or off, it would send a disruptive 'spike' through the communications flow, interrupting the process and requiring a retransmission of the temporarily-disrupted data. Leaving a tap permanently turned on, however, both increased the power consumption of the network as a whole and put additional usage time on the tap, potentially reducing its service life. The network needed taps to be available on call rather than continuously, but also needed taps which could be powered on or off without interfering with the communications flow.

1.B. Description of the Related Art

In the field of monitoring network performance, the prior art has focused on the development, and uses, of network taps devoted to analytical purpose and monitoring of the communications flow. The stabler a network the less it needs a tap to monitor non-existent problems; yet the more taps that are tuned in can create disruptive interference and interruption when they are turned on or off.

This is particularly crucial when taps must be turned on and off to properly assess and evaluate intermittent, context-dependent, or transient signal interference effects; or identifying and prioritizing sub-network stability. It is also important in the longer context as part of an ongoing management effort to train, maintain, and sustain a continuous and uninterrupted network communications flow where the periphery and set of connections will change over time, without disrupting the overall structure and process. For these and other reasons apparent to those skilled in the art, taps needed to be such that they could be turned on and off. Yet each time they were, they created an interruption which reduced the overall network capability.

With the increase in network traffic has also come an increase in the number, and differing natures, of problems which can afflict a network. The Internet in particular uses a packet-based protocol which presumes both a constantly changing set of network connections and that each connection is only semi-dependable. Signals can be mis-addressed, mis-routed, mis-timed, disordered, degraded, or otherwise interfered with. Connections can be formed, dropped, spoofed, or otherwise be imperfect; and they definitely change over time—sometimes, over a very short time indeed. The more taps, the better the monitoring could be, but the greater the overall drain on the network's power from just the taps would be. The prior art simply accepted the "fact" that turning a tap's power on or off generated a microsecond delay, which seemed to be fine—until we reached the age of gigabit, high-speed, and broadband network transmissions.

The prior art used a switching approach to turn on and off both the power to the monitoring network tap and to redirect the communication flow through the network tap and the attached monitoring device(s). Up until now, people simply designed into their networks an acceptance that a price of using a tap was the fact that every time the tap's power was turned on or off, there would be a microsecond delay and a signal-damaging spike caused by the impedance change to the circuit as a whole as the communications flow was switched.

SUMMARY OF THE INVENTION

A network tap is described herein that can be used to monitor the network traffic and communications flow over a particular connection, whose power can be turned on or off without interrupting the communications flow over the network. By incorporating elements that reduce the impedance change from the power transition to below the network's noise level, the changes caused from the tap's power being turned on or off disappear beneath the filter of the general circuit noise the system already is capable of managing.

In a further embodiment of the invention, the tap incorporates a transformer that will managed the power flow within the communications circuit, thereby allowing power to pass over the communications network simultaneously (e.g. power over Ethernet), in addition to creating zero interrupt from a below-noise impedance change.

BRIEF DESCRIPTION OF THE DRAWINGS

The present invention in illustrated by way of example, and not by way of limitation, in the figures of the accompanying drawings and in which like reference numerals refer to similar elements and in which.

DETAILED DESCRIPTION OF THE DRAWINGS

Figure 1:
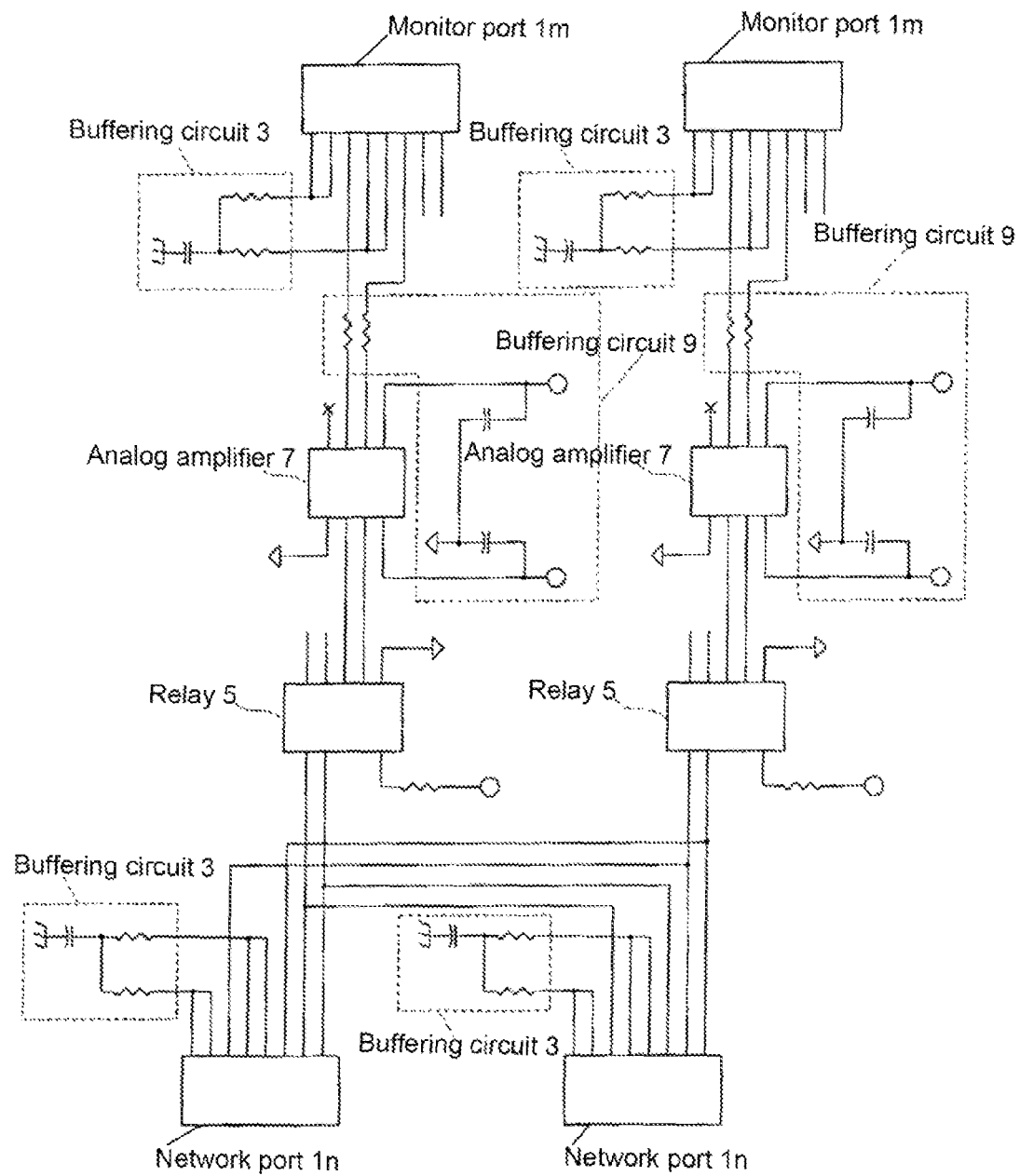
FIG. 1, shows, in accordance with embodiments of the invention, a circuit diagram using standard symbols for electrical writing and elements (resistors, grounds, capacitors) well known to those skilled in the current art.

FIG. 1 is a circuit diagram for the preferred embodiment of the present form of the invention, using standard symbols for electrical wiring and elements (resistors, grounds, capacitors) well known to those skilled in the current art. On the top side of FIG. 1 are a pair of RJ-45 monitor ports [1m], connected below is its own buffering circuit [3]. Each monitor port [1m] is connected also to an analog amplifier [7] further down, with each analog amplifier having its own buffering circuit [9]. Each analog amplifier [7] connects in turn to a relay [5] drawn just below mid-page, and each relay is in turn connected to the network ports [1n] at the bottom of the drawing, each network port [1n] having its buffering circuit [3]. As can be seen by the wires layout the signal flow from the communications link goes both through and between the network ports [1n] and through the relays [5] and analog amplifiers [7] to the monitoring ports [1m].

Figure 2:
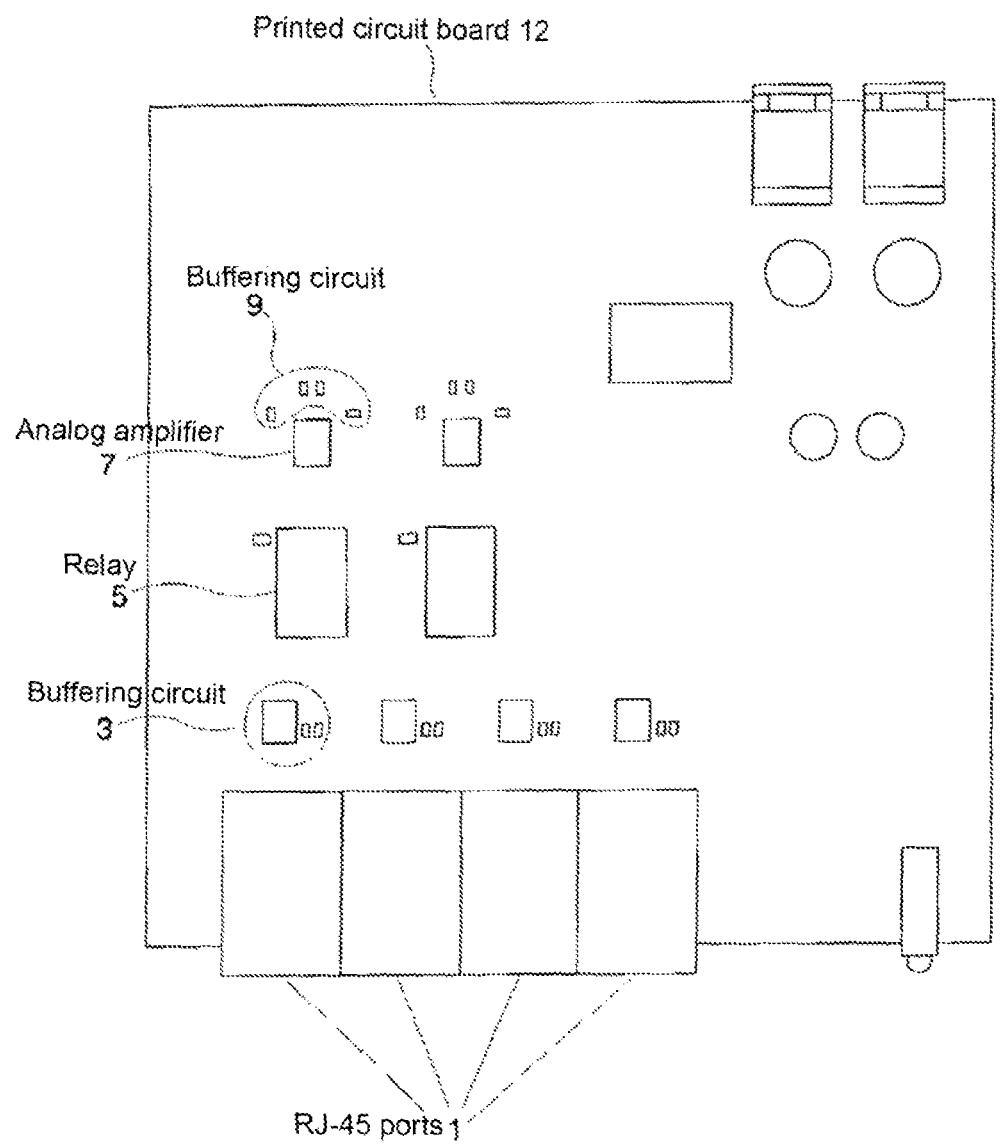
FIG. 2 shows, in accordance with embodiments of the invention, a simplified circuit drawing designed for the 10-100 megabit per second or copper standard and laid out on an industry-standard printed circuit board (PCB).

FIG. 2 is a simplified circuit drawing of the preferred embodiment of the present form of the invention designed for the 10-100 megabit per second or copper standard and laid out on an industry-standard printed circuit board (PCB) [12]. For simplicity's sake, the wiring between the elements which is shown in FIG. 1 and contained within the PCB [12], is not drawn here.

At the bottom left side of FIG. 2, which corresponds to the front edge of the PCB [12] are the two pairs of RJ-45 jacks [1]; through these paired ports the communications signals flow through the network link and to the monitoring device (neither network nor monitoring devices, being beyond the scope of this invention, are shown). Each pair of jacks is linked to serve as complementary inputs and outputs (i.e. the input from one is the output from a second, while the output from one is the input to a second), and the pairs are connected so the signals will flow from one pair to the other through the tap circuitry. Above the RJ-45 ports [1] are their buffering circuits [3], above which are the relays [5]; above the relays are the analog amplifiers [7], and above the analog amplifiers are their buffering circuits [9].

Each buffering circuit [3, 9] comprises at least one ground, capacitor, and resistor; however buffering circuits, their design and components thereof are well known in the prior art. The analog amplifier [7] serves as the signal driver from the communications link to the monitoring ports (the other pair of RJ-45 jacks [1]), and draws and uses, in the preferred embodiment, no more than 8 picofarads. Only one of each set of buffering circuits [3, 9], relay [5], and analog amplifier [9] is specifically identified with their duplicate or duplicates repeated and evident to the right from that individually numbered.

The circuitry for powering the network tap from an A/C source and indicating that the network tap is powered and active through a front Light-Emitting Diode (LED), is industry standard.

Figure 3:
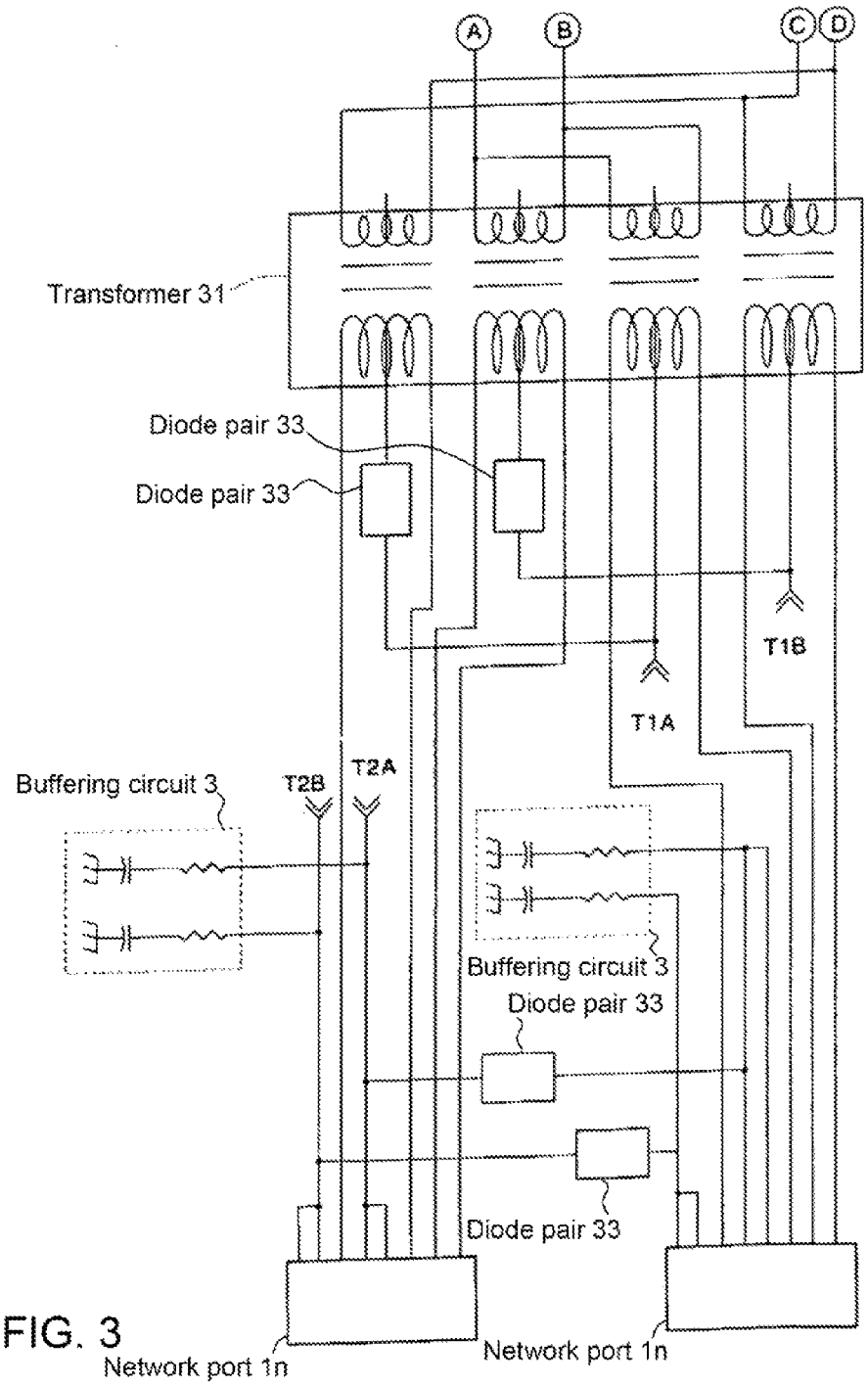
FIG. 3 shows, in accordance with embodiments of the invention, the second half of a two-part circuit drawing for the embodiment of the present invention designed for power-over-Ethernet connections.

There is the first half of a two-part circuit drawing for the embodiment of the present invention designed for power-over-Ethernet connections; the second part of the circuit drawing being FIG. 3. The wire connections between the two halves are labeled A, B, C, D and shown from left to right in that order.

At the top of FIG. 1 are the pair of RJ-45 monitor ports [1m] with their buffering circuits [3]; connected to each monitor port [1m] and drawn below it is an analog amplifier [7], each such with its buffering circuit [9]; connected to the analog amplifier [7] and drawn below it is a relay [5], which in turn will be connected to the power-buffering transformer[31] (shown in FIG. 3) through the circuit connections (A), (B), (C), and (D).

FIG. 3 is the second half of a two-part circuit drawing for the embodiment of the present invention designed for power-over-Ethernet connections, the first part being mentioned above. This shows the circuitry between the power-buffering transformer [31] and the network jacks [1n]. Each input/output pairing is also connected to a buffering circuit [3] comprising at least one ground, capacitor, and resistor as above. There are also four labeled connections [T1A, T1B, T2A, T2B] which indicate the sub-circuit shown in FIG. 4 and described below.

Figure 4:
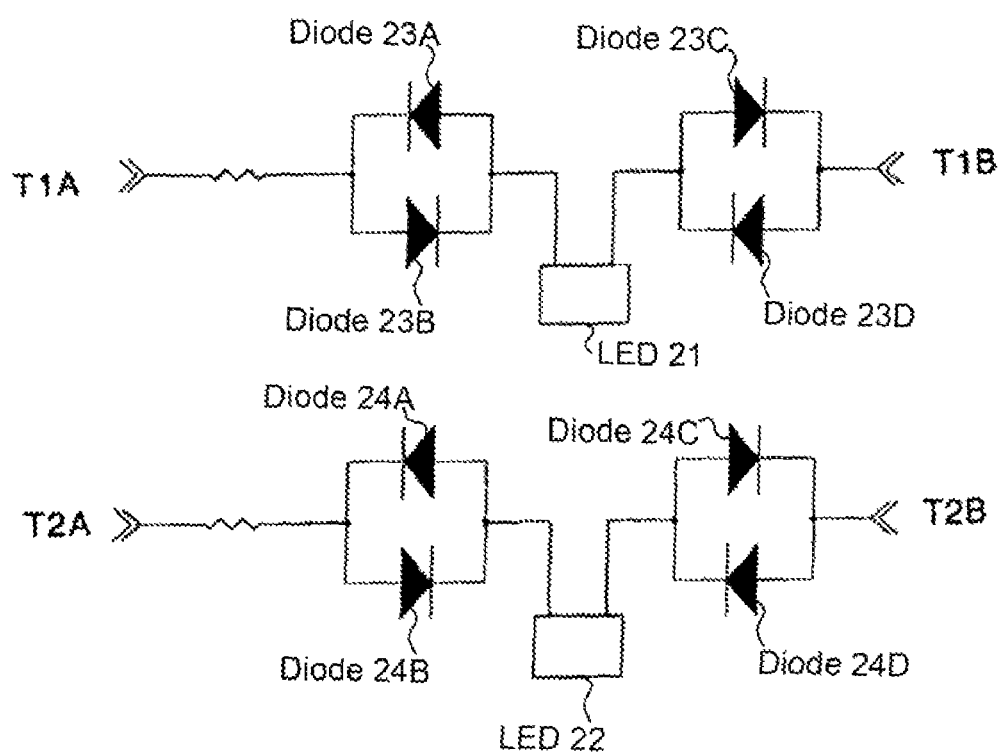
FIG. 4 shows, in accordance with embodiments of the invention, the details of the portion of the internal circuitry for the power-over-Ethernet embodiment which indicate between which pair of RJ-45 jacks the power of flowing.

FIG. 4 is the details of the portion of the internal circuitry for the power-over-Ethernet embodiment which indicate between which pair of RJ-45 jacks the power is flowing. Under the 802.11 AF standard, power may flow over the used pair or the unused pair, and the direction of the power flow may be from either direction. Yet a LED [21, 22] requires a particular direction of current flow. To ensure that the power flow goes in the direction needed to light up the LED [21, 22] for the pair in which the power is flowing, for each channel four diodes [23A, 23B, 23C, 23D; 24A, 24B, 24C, 24D] in two complementary pairs [33] are used for current steering, as is known to those in the industry and familiar with the prior art, to direct the current in the direction needed.

OBJECTS OF THE INVENTION

It is an object of the present invention to provide a permanent, inexpensive facility in a local area network to allow monitoring of data transmission traffic without disrupting ongoing data transmission by either interrupting transmission or upsetting its characteristic transmission impedance when the power to the tap is turned on or off.

It is another object of the present invention to provide the above function even when the power for the monitoring tap may be drawn from the communication link using the power over Ethernet standard and approach.

It is still another object of the present invention to provide a monitor port that is sufficiently inexpensive that it can be installed at a plurality of nodes at the initial installation of a local area network transmission system and left in place, without requiring a commitment to continual power to the network tap.

It is another object of the present invention to buffer the power flow through the analog amplifier and relay to the monitoring port to prevent spikes and disruption from power fluctuations so the signal through the relay will not disrupt any link between the monitored devices, resulting in network data flow interruption.

DETAILED DESCRIPTION

When operating LAN, WAN, Ethernet, or other data communications networks, it is vital to monitor data transmission and communication flows, both physical and logical, with an absolute minimum of intrusion or disruption of the data stream. The transmission can be simplex or half-duplex mode, or transmission can be in full-duplex mode (both directions simultaneously, usually using two oppositely-directed simplex channels). The most common forms of connections are either the 10-100 megabyte Ethernet (commonly known as "copper" for the wiring first used), or follow the power-over-Ethernet, 802.11 AF standards.

Installing a network tap leaves open the question of what happens when the power to the tap is turned on or off. In the prior art, each time the power to the tap is switched there is a 1 millisecond delay as the impedance spike caused by the power change interrupts the communications flow through the network tap.

From the basic of Ohm's Law, we know that the current is a function of the voltage and resistance it encounters, that is, $$I=V/R \qquad \text{EQ. 1}$$

where I is the current, V is the voltage, and R is the resistance.

The impedance in a circuit is the natural restraint (or resistance) on the flow of any electric current through that circuit, that is, the material characteristics which restrain the flow of electric current, similar to a barrier in a river. If the barrier is fully open, there is a minimal impedance; if gates close (or the barrier is raised above the bottom), then the flow is restrained. With alternating current, the phase factors become important to remember as their vectors affect the smoothness of the flow. Voltage and current for A/C are thus sinusoidal functions of time and are represented graphically by the horizontal component of a rotating arrow called a phasor. In common practice, phasors are drawn as fixed arrows, corresponding to a snapshot of the rotating phasor at some arbitrary point in time. The advantage of the phasor representation is that it gives a graphical representation of the relative phases and magnitudes of various sinusoidal functions.

The fundamental equation for calculating impedance for a circuit is well known and is as follows:

$$I_c = \frac{1}{W_c} = \frac{1}{2\pi f C} \qquad \text{EQ. 2}$$

where $I_c$ is the impedance of the circuit, $W_c$ is the angular velocity, and C is the capacitance; from this it can readily be seen that:

$$W=2\pi f,$$

that is, that the angular velocity is a linear function of the frequency (f) of the current.

From this it is relatively easy to deduce that as the frequency of the current goes up (i.e. as we reach higher bandwidths) the impedance caused by that current reduces. What is harder to realize is that the as the frequency goes up, the need to reduce the impedance encountered in the circuit from other sources must be reduced to avoid interruption. Impedance can thereby be seen either as a measure of the ratio of the voltage required to have a unit value of uninterrupted current, or as a measure of the sensitivity to changes in the current flow. The more sensitive a circuit is to changes in the current flow, the more any impedance change will create interference with the signaling; that is, the power and signal functions will interact—negatively. Turning this around, the signal load of a communications link can be thought of as the base 'noise level'.

The flow of communication through the network tap should be transparent. The preferred embodiment of the present form of the invention uses a passive-link integrity which allows the network communication to flow through the tap even when the power is turned off to either the tap or any of the monitoring devices to which it may be connected.

Impedance matching can also be accomplished using discrete passive electronic devices such as individual capacitors and inductors. However, at such digital transmission speed, design difficulties such as component and conductor placement and orientation pose significant design difficulties, which would be expected to affect adversely upon production yield, and operational time demands.

It is taking the signal from the communications flow and transmitting it to the monitoring ports where disruptive interference can arise from a power spike, when the tap's power is turned on or off and the signal is duplicated and relayed to the monitoring port. But using a relay and an analog amplifier to take the signal from the communication flow and then boost it and send it to the monitoring port prevents this, as long as the impedance load on the monitor side of the circuitry is below the noise level of the communication flow. In preferred embodiment, this relay and analog amplifier circuitry is also buffered against transient power fluctuations, using a resistor to constrain a power surge, and a capacitor, ground, and DC coupling relay to support a power lapse.

A standard communications level at present is a signal flowing between 10 to 100 megabits per second, also known as the 'copper' level of network flow. Using this as the base 'noise level' which must not be interfered with by a power change, and using the above equations and algebraic transformations thereof, it can be seen that as long as the impedance from the monitor side of a amplification-and-relay of the signal does not change by more than 8 picofarads, the change from turning the power to the network tap on or off will not interfere with the communication flow through the tap.

By taking the input signal from the source and using a low-power analog amplifier to drive it through the tap, that is, specifically selecting an analog amplifier which has a minimal load on the monitor side of the relay, the problem of interrupts can be effectively eliminated. The preferred embodiment of this invention uses an analog amplifier which has less than or equal to an 8 picofarad load on the monitor side when the power to the tap is turned on or off. An example of an acceptable analog amplifier [7] is the AD813 IAR from Analog Devices, Inc. of Norwood, MA, the specific characteristics of which are detailed at http://www.analog.com/Analog_root/productPage/productHome/0,2121,AD8131,00.html, and whose technical data sheets can be found at: http://www.analog.com/UploadedFiles/Data_Sheets/413277462AD8131_a.pdf, a copy of which are attached hereto an incorporated herein by reference. An example of an acceptable relay [5] is the 155-1230ND from Digi-Key Corporation of Thief River Falls, Minn., the specific characteristics of which can be located through http://www.digikey.com.

An alternative solution is needed when there may be a power flow, as well as communication signal, flowing through the communications link, e.g. when the communications link is operating under the power-over-Ethernet standard. This power flow may vary depending on how the paired links are being used; sometimes the power flows over the unused pair, sometimes over the used pair.

By interposing between the first and second network ports a transformer which also is connected to the tap circuitry, that is the signal relay, analog amplifier, and monitoring ports, the communication signal can be extracted and forwarded on. This embodiment includes additional LEDs to indicate whether the power is flowing through the Ethernet connection and, if so, whether this is through the used pairs, the unused pairs, or both. The transformer is preferentially capable of handling 350 milliamps, thereby meeting the IEEE standard 802.3 AF for power over Ethernet devices. A ferroid head is incorporated from the center of the tap to counter any A/C noise before it is sent to the relay and monitor circuitry. Such a transformer can be found as the Dual 10/100 Ethernet TG110-8250NJ Halo.

Although the present invention has been described chiefly in terms of the two variants depending on the communications standard for that link, it is to be understood that the disclosure is not to be interpreted as limiting. Various alterations and modifications will no doubt become apparent to those skilled in the art after having read the above disclosure. Such modifications may involve other features which are already known in the design, manufacture and use of network taps, and which may be used instead of or in addition to features already described herein. The industry-standard components specifically detailed herein or in the drawings are not limiting but instructive of the embodiment of the invention, and variations which are readily derived through market substitutions or mechanical transformations which are standard or known to the appropriate art are not excluded by omission. Accordingly, it is intended that the appended claims are interpreted as covering all alterations and modifications as fall within the true spirit and scope of the invention in light of the prior art.

The scope of this invention includes any combination of the elements from the different embodiments disclosed in this specification, and is not limited to the specifics of the preferred embodiment or any of the alternative embodiments mentioned above. Individual user configurations and embodiments of this invention may contain all, or less than all, of the elements disclosed in the specification according to the needs and desires of that user. The claims stated herein should be read as including those elements which are not necessary to the invention yet are in the prior art and are necessary to the overall function of that particular claim, and should be read as including, to the maximum extent permissible by law, known functional equivalents to those elements disclosed in this specification, even though those known functional equivalents are not exhaustively detailed herein.

Additionally, although claims have been formulated in this application to particular combinations of elements, it should be understood that the scope of the disclosure of the present application also includes any single novel element or any novel combination of elements disclosed herein, either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A network tap that enables monitoring devices to analyze a communication flow through a connection while minimizing disruption to said communication flow when said network tap is powered on and off, said network tap comprising:
    means for supplying power to said network tap;
    a pair of network ports including a first network port and a second network port, each network port having an input and output, for connecting said network tap to said connection, said first network port being directly coupled to a first buffering circuit that includes at least a first capacitor, a first resistor, and a second resistor, said first resistor and said second resistor being connected in parallel, said second network port being directly coupled to a second buffering circuit that includes at least a second capacitor, a third resistor, and a fourth resistor, said third resistor and said fourth resistor being connected in parallel;
    a first internal channel for the input of a first communication flow through a first member of said pair of network ports, that duplicates and then forwards said first communication flow both within said tap and to an output of a second member of said pair of network ports;
    a second internal channel for the input of a second communication flow through said second member of said pair of network ports, that duplicates and then forwards said second communication flow both within said tap and to an output of said first member of said pair of network ports;
    a pair of monitoring ports including a first monitoring port and a second monitoring port, each monitoring port having an output for each of said first and second internal channels; and
    means for reducing disturbance, created within said network tap by said network tap's power being turned on or off, to a level below that detectable by said communication flow, wherein said means for reducing said disturbance include
        a set of relays including a first relay and a second relay, wherein said first relay of said set of relays is configured to receive signals from said first communication flow, and said second relay of said set of relays is configured to receive signals from said second communication flow, and
        a set of analog amplifiers including a first analog amplifier and a second analog amplifier, said first analog amplifier being connected to both said first network port and said second network port through said first relay, said second analog amplifier being connected to both said first network port and said second network port through said second relay, wherein each analog amplifier of said set of analog amplifiers is connected to a monitoring port of said pair of monitoring ports, wherein said first analog amplifier is configured to boost and direct the signals from said first communication flow to said first monitoring port, and said second analog amplifier is configured to boost and direct said signals from said second communication flow to said second monitoring port, said first analog amplifier having a third buffering circuit that includes at least a third capacitor, said second analog amplifier having a fourth buffering circuit that includes at least a fourth capacitor.

2. A network tap as in claim 1, wherein said first monitoring port being directly coupled to a fifth buffering circuit that includes at least a fifth capacitor, and said second monitoring port being directly coupled a sixth buffering circuit that includes at least a sixth capacitor.

3. A network tap as in claim 1, wherein said set of analog amplifiers has less than an 8 picofarad load on said monitor side.

4. A network tap as in claim 3, wherein said network tap further comprises:
    means for buffering said set of analog amplifiers from transient power surges; and
    means for buffering said set of analog amplifiers from transient power failures.

5. A network tap as in claim 4, wherein said means for buffering said set of analog amplifiers from transient power surges comprises a 100 Ohm resistor between said power source and said set of analog amplifiers.

6. A network tap as in claim 4, wherein said means for buffering said set of analog amplifiers from transient power failures comprise a DC coupling relay, a grounding element, and a 0.1 UF capacitor.

7. A network tap as in claim 1, wherein said third buffering circuit further includes at least a fifth resistor and a sixth resistor, said fifth resistor and said sixth resistor being connected in parallel; and wherein said fourth buffering circuit further includes at least a seventh resistor and an eighth resistor, said seventh resistor and said eighth resistor being connected in parallel.

8. A network tap as in claim 1, wherein said first resistor is connected to a ground through said first capacitor, and wherein said second resistor also is connected to said ground through said first capacitor.

9. A network tap that enables monitoring devices to analyze a communication flow through a 10-100 megabit Ethernet connection while minimizing disruption to said communication flow when said network tap is powered on and off, said network tap comprising:
   means for supplying power to said network tap;
   a pair of network ports including a first network port and a second network port, each network port having an input and output, for connecting said network tap to said connection;
   a first internal channel for said input of a first communication flow through a first member of said pair of network ports, that duplicates and then forwards said first communication flow both within said tap and to an output of a second member of said pair of network ports;
   a second internal channel for said input of a first communication flow through said second member of said pair of network ports, that duplicates and then forwards said second communication flow both within said tap and to an output of said first member of said pair of network ports;
   a pair of monitoring ports including a first monitoring port and a second monitoring port, each monitoring port having an output for each of said first and second internal channels, said first monitoring port being directly coupled to a first buffering circuit that includes at least a first capacitor, a first resistor, and a second resistor, said first resistor and said second resistor being connected in parallel, said second monitoring port being directly coupled to a second buffering circuit that includes at least a second capacitor, a third resistor, and a fourth resistor, said third resistor and said fourth resistor being connected in parallel; and
   means for reducing disturbance, created within said network tap by said network tap's power being turned on or off, to a level below that detectable by said communication flow, wherein said means for reducing said disturbance include
      a set of relays including a first relay and a second relay, wherein said first relay of said set of relays is configured to receive signals from said first communication flow, and said second relay of said set of relays is configured to receive signals from said second communication flow,
      a set of analog amplifiers including a first analog amplifier and a second analog amplifier, said first analog amplifier being connected to both said first network port and said second network port through said first relay, said second analog amplifier being connected to both said first network port and said second network port through said second relay, wherein each analog amplifier of said set of analog amplifiers is connected to a monitoring port of said pair of monitoring ports, wherein said first analog amplifier is configured to boost and direct said signals from said first communication flows to said first monitoring port, and said second analog amplifier is configured to boost and direct said signals from said second communication flows to said second monitoring port, said first analog amplifier having a third buffering circuit that includes at least a third capacitor, said second analog amplifier having a fourth buffering circuit that includes at least a fourth capacitor, and
      a transformer, wherein said transformer is positioned between a first member and a second member of said pair of network ports, wherein said transformer is configured to manage power flow between said pair of network ports over a power-over-Ethernet connection.

10. A network tap as in claim 9, where said first network port has being directly coupled a fifth buffering circuit that includes at least a fifth capacitor, and said second network port being directly coupled a sixth buffering circuit that includes at least a sixth capacitor.

11. A network tap as in claim 10, further comprising, for each internal channel between each pair of network ports, a Light-Emitting Diode (LED), connected between said first member and second member of said pair of network ports, which illuminates when power is flowing over that internal channel.

12. A network tap as in claim 11, further comprising current-directing circuits for said LED which ensure a correct direction of current flow through said LED regardless of said direction of flow of said current through said channel.

13. A network tap as in claim 9, wherein said third buffering circuit further includes at least a fifth resistor and a sixth resistor, said fifth resistor and said sixth resistor being connected in parallel; and wherein said fourth buffering circuit further includes at least a seventh resistor and an eighth resistor, said seventh resistor and said eighth resistor being connected in parallel.

14. A network tap as in claim 9, wherein said first resistor is connected to a ground through said first capacitor, and wherein said second resistor also is connected to said ground through said first capacitor.

* * * * *